(12) United States Patent
Liu et al.

(10) Patent No.: US 10,496,287 B2
(45) Date of Patent: Dec. 3, 2019

(54) METHOD AND APPARATUS FOR CACHING DATA

(71) Applicant: EMC IP Holding Company LLC, Hopkinton, MA (US)

(72) Inventors: Yousheng Liu, Beijing (CN); Jian Gao, Beijing (CN); Xinlei Xu, Beijing (CN); Ruiyong Jia, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/848,488

(22) Filed: Dec. 20, 2017

(65) Prior Publication Data

US 2018/0173435 A1   Jun. 21, 2018

(30) Foreign Application Priority Data

Dec. 21, 2016 (CN) .......................... 2016 1 1192431

(51) Int. Cl.
*G06F 3/06* (2006.01)
*G06F 12/0815* (2016.01)

(52) U.S. Cl.
CPC ............ *G06F 3/0613* (2013.01); *G06F 3/065* (2013.01); *G06F 3/0619* (2013.01); *G06F 3/0625* (2013.01); *G06F 3/0631* (2013.01); *G06F 3/0659* (2013.01); *G06F 12/0815* (2013.01); *G06F 2212/283* (2013.01); *G06F 2212/286* (2013.01); *G06F 2212/621* (2013.01)

(58) Field of Classification Search
CPC ........... G06F 2212/286; G06F 2212/62; G06F 2212/621; H04L 67/1095; H04L 29/08
See application file for complete search history.

(56) References Cited

U.S. PATENT DOCUMENTS

| 7,062,675 | B1 | 6/2006 | Kemeny et al. | |
|---|---|---|---|---|
| 7,219,202 | B2 * | 5/2007 | Satoyama | ........... G06F 11/2069 707/999.202 |
| 7,233,977 | B2 | 6/2007 | Gupta et al. | |
| 7,421,552 | B2 | 9/2008 | Long | |
| 7,996,574 | B2 | 8/2011 | Gupta et al. | |

(Continued)

OTHER PUBLICATIONS

Thomas B. Berg, Maintaining I/O Data Coherence in Embedded Multicore Systems. IEEE, 2009. (Year: 2009).*

*Primary Examiner* — Khoa D Doan
(74) *Attorney, Agent, or Firm* — BainwoodHuang (57) ABSTRACT

Embodiments of the present disclosure relate to methods and apparatuses for caching data. A method comprises writing data into a first cache module on a first processor in response to receiving a first request for caching the data from a client module running on the first processor. The method further comprises transmitting, to the client module, a first indication that the data has been written into the first cache module. The method further comprises, in response to receiving from the client module a second request for synchronizing the data to a second processor, transmitting to the second processor a first command for causing the data to be written into a second cache module on the second processor. In addition, the method further comprises transmitting to the client module a second indication that the data has been synchronized.

13 Claims, 9 Drawing Sheets

(56) References Cited

U.S. PATENT DOCUMENTS

| | | | |
|---|---|---|---|
| 8,200,885 B2* | 6/2012 | Sartore | G06F 12/0638 711/100 |
| 8,327,080 B1* | 12/2012 | Der | G06F 12/0804 711/141 |
| 8,495,299 B2* | 7/2013 | Fuller | G06F 12/0802 711/118 |
| 8,650,328 B1* | 2/2014 | Chatterjee | G06F 11/2097 710/4 |
| 9,037,793 B1* | 5/2015 | O'Brien, III | G06F 3/0689 711/114 |
| 9,122,589 B1* | 9/2015 | Bono | G06F 12/0246 |
| 9,298,636 B1* | 3/2016 | O'Brien, III | G06F 12/0888 |
| 9,454,326 B1* | 9/2016 | Bono | G06F 3/065 |
| 9,778,865 B1 | 10/2017 | Srinivasan et al. | |
| 9,830,082 B1 | 11/2017 | Srinivasan et al. | |
| 10,089,037 B1* | 10/2018 | Bono | G06F 3/0649 |
| 10,180,790 B1* | 1/2019 | Taylor | G06F 3/0608 |
| 2003/0233613 A1* | 12/2003 | Ash | G06F 11/0727 714/799 |
| 2004/0103238 A1* | 5/2004 | Avraham | G06F 11/1441 711/102 |
| 2004/0136693 A1* | 7/2004 | Iwasaki | G11B 19/04 386/240 |
| 2004/0184309 A1* | 9/2004 | Bress | G11B 19/04 365/154 |
| 2005/0063216 A1* | 3/2005 | Wilkins | G06F 11/1666 365/154 |
| 2006/0004973 A1* | 1/2006 | Sardella | G06F 11/1666 711/162 |
| 2006/0106982 A1* | 5/2006 | Ashmore | G06F 11/2089 711/114 |
| 2006/0212644 A1* | 9/2006 | Acton | G06F 1/30 711/103 |
| 2006/0277347 A1* | 12/2006 | Ashmore | G06F 3/0611 710/313 |
| 2007/0094456 A1* | 4/2007 | Matsui | G06F 11/2058 711/154 |
| 2008/0082856 A1* | 4/2008 | French | G06F 11/2089 714/2 |
| 2008/0155307 A1* | 6/2008 | French | G06F 11/2089 714/3 |
| 2009/0077312 A1* | 3/2009 | Miura | G06F 11/1441 711/113 |
| 2009/0216945 A1* | 8/2009 | Shimada | G06F 13/28 711/113 |
| 2009/0228676 A1* | 9/2009 | Naganuma | G06F 3/0605 711/173 |
| 2011/0208933 A1* | 8/2011 | Selfin | G06F 11/108 711/162 |
| 2011/0239043 A1* | 9/2011 | Vedder | G06F 1/263 714/14 |
| 2012/0004011 A1* | 1/2012 | Chun | G06F 11/1456 455/550.1 |
| 2012/0233377 A1* | 9/2012 | Nomura | G06F 12/0893 711/3 |
| 2012/0311271 A1* | 12/2012 | Klein | G06F 12/0873 711/141 |
| 2013/0007370 A1* | 1/2013 | Parikh | G06F 12/0842 711/129 |
| 2013/0013871 A1* | 1/2013 | Ogihara | G06F 11/1666 711/156 |
| 2013/0073826 A1* | 3/2013 | Tatara | G06F 3/0608 711/165 |
| 2014/0379974 A1* | 12/2014 | Yamamoto | G06F 3/0608 711/103 |
| 2015/0278528 A1* | 10/2015 | Xing | G06F 21/53 726/26 |
| 2016/0210173 A1* | 7/2016 | Bookman | H04L 67/06 |
| 2017/0206178 A1* | 7/2017 | Ogawa | G06F 3/061 |
| 2017/0371597 A1* | 12/2017 | Jia | G06F 3/0689 |
| 2018/0302469 A1* | 10/2018 | Yang | H04L 67/1095 |
| 2018/0322281 A1* | 11/2018 | Borlick | G06F 21/554 |

* cited by examiner

METHOD AND APPARATUS FOR CACHING DATA

RELATED APPLICATIONS

This application claim priority from Chinese Patent Application Number CN201611192431.8, filed on Dec. 21, 2016 at the State Intellectual Property Office, China, titled "METHOD AND APPARATUS FOR CACHING DATA" the contents of which is herein incorporated by reference in its entirety.

FIELD

Embodiments of the present disclosure generally relate to the field of data storage, and specifically relate to a scheme for caching data.

BACKGROUND

In a common storage product, a system architecture including a plurality of storage processors (SPs, also called processing nodes) attached with a shared disk is usually utilized to improve computing capability and input/output (IO) throughput of the storage product. The plurality of storage processors are connected via an internal communication interface and perform data synchronization with the internal communication interface. In a storage processor, there is usually a cache module for caching data to be written into the shared disk.

In a conventional scheme, such cache module may be only used for caching and synchronizing (e.g., with a peer SP) user data (namely, the data written into the shared disk) and may only be used by an upper module above the cache module. As a result, non-user data, such as mapping information of storage objects and metadata of a file system, is only stored in a local memory and will not be synchronized to a peer memory, which thereby might lead to inconsistent states of the processors. A lower module below the cache module cannot use the service provided by the cache module. Therefore, the data in the lower module cannot be cached conveniently. Moreover, when the system power supply fails, the data in the cache (e.g., the data which has not been written into the shared disk yet) might get lost.

SUMMARY

Embodiments of the present disclosure provide a scheme for caching data.

According to a first aspect of the present disclosure, there is provided a method for caching data. The method comprises: in response to receiving a first request for caching data from a client module running on a first processor, writing the data into a first cache module on the first processor; transmitting, to the client module, a first indication that the data has been written into the first cache module; in response to receiving from the client module a second request for synchronizing the data to a second processor, transmitting, to the second processor, a first command for causing the data to be written into a second cache module on the second processor; and transmitting, to the client module, a second indication that the data has been synchronized.

According to a second aspect of the present disclosure, there is provided a method for caching data. The method comprises: transmitting, to a first cache module on a first processor, a first request for caching data; in response to receiving from the first cache module a first indication that the data has been written into the first cache module, transmitting, to the first cache module, a second request for synchronizing the data to a second processor, such that the data is written into a second cache module on the second processor; and receiving a second indication that the data has been synchronized.

According to a third aspect of the present disclosure, there is provided a method for caching data. The method comprises: in response to receiving from a first processor a first command for synchronizing data cached in a first cache module on the first processor to a second processor, writing the data into a second cache module on the second processor.

According to a fourth aspect of the present disclosure, there is provided a first cache component. The first cache component is located on a first processor and comprises a controller. The controller is configured to in response to receiving a first request for caching data from a client module running on a first processor, write the data into the first cache component; transmit, to the client module, a first indication that the data has been written into the first cache component; in response to receiving from the client module a second request for synchronizing the data to a second processor, transmit, to the second processor, a first command for causing the data to be written into a second cache component on the second processor; and transmit, to the client module, a second indication that the data has been synchronized.

According to a fifth aspect of the present disclosure, there is provided a client component running on a first processor and comprises a controller. The controller is configured to: transmit, to a first cache module on the first processor, a first request for caching data; in response to receiving from the first cache module a first indication that the data has been written into the first cache module, transmit, to the first cache module, a second request for synchronizing the data to a second processor, such that the data is written into a second cache module on the second processor; and receive a second indication that the data has been synchronized.

According to a sixth aspect of the present disclosure, there is provided a second cache component. The second cache component is located on a second processor and comprises a controller. The controller is configured to, in response to receiving from a first processor a first command for synchronizing data cached in a first cache component on the first processor to a second processor, write the data into the second cache component.

According to a seventh aspect of the present disclosure, there is provided a storage system. The storage system comprises a first processor and a second processor. The first processor and the second processing are communicatively coupled. The first processor at least comprises the first cache component according to the fourth aspect of the present disclosure. The second processor at least comprises the second cache component according to the sixth aspect of the present disclosure.

According to the eighth aspect of the present disclosure, there is provided a computer program product that is tangibly stored on a non-transient computer readable medium and includes machine-executable instructions. The machine-executable instructions, when being executed, cause the machine to execute any step of the method according to the first aspect of the present disclosure.

According to the ninth aspect of the present disclosure, there is provided a computer program product that is tangibly stored on a non-transient computer readable medium and includes machine-executable instructions. The machine-executable instructions, when being executed, cause the machine to execute any step of the method according to the second aspect of the present disclosure.

According to the tenth aspect of the present disclosure, there is provided a computer program product that is tangibly stored on a non-transient computer readable medium and includes machine-executable instructions. The machine-executable instructions, when being executed, cause the machine to execute any step of the method according to the third aspect of the present disclosure.

This Summary is provided to introduce a selection of concepts that will be further described in Detailed Description of Embodiments below. This Summary is not intended to identify key features or essential features of the present disclosure or limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

Throughout the drawings, the same or similar reference symbols refer to the same or similar elements.

DETAILED DESCRIPTION OF EMBODIMENTS

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

Figure 1:
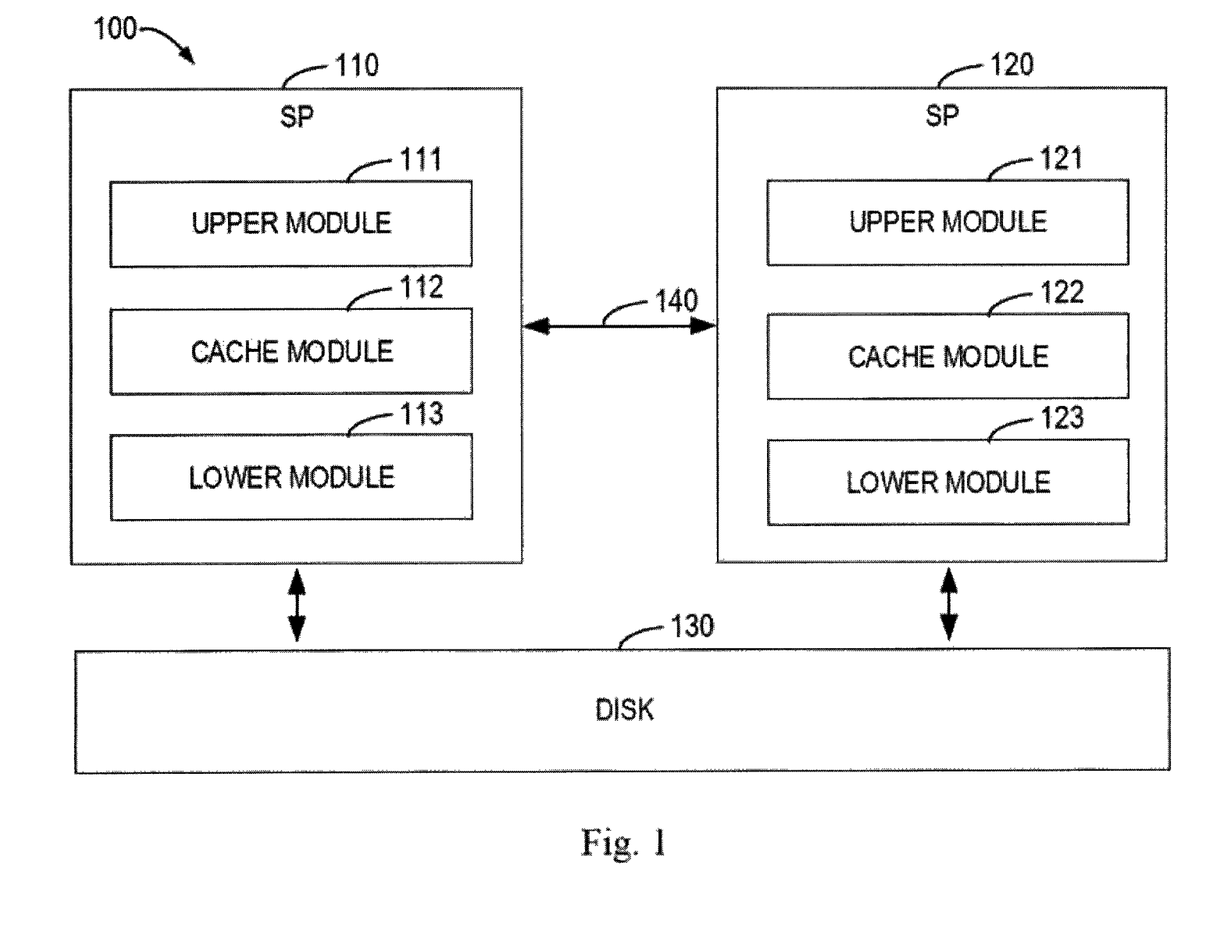
FIG. 1 illustrates a block diagram of an example storage system 100 having two SPs sharing one disk in a conventional scheme.

FIG. 1 illustrates a block diagram of an example storage system 100 having two SPs sharing one disk in a conventional scheme. As shown in FIG. 1, in the storage system 100, there are two SPs sharing one disk 130, namely, SP 110 and SP 120. The two SPs may interact with each other via a command interface (CMI) 140.

The SP 110 includes a cache module 112, an upper module 111 above the cache module 112 and a lower module 113 below the cache module 112. Similarly, the SP 120 includes a cache module 122 corresponding to the cache module 112, an upper module 121 corresponding to the upper module 111 and a lower module 123 corresponding to the lower module 113.

SP 110 is taken as an example. The main function of the cache module 112 described here is to temporarily store user data in a dynamic random access memory (DRAM), and then write it into the disk 130 at suitable time. The cache module 112 may perform data synchronization with the cache module 122 via the CMI 140. For example, when a host writes data to the SP 110, the data will be written into the cache module 112, and then synchronized to the cache module 122. The host may read from the SP 120 the data written to the SP 110.

The upper module 111 described here may include, for example, a host module interfacing with the host, a user logic unit number module for providing logic storage units, and a file system module for providing a file system interface. The upper module 111 does not cache data directly by itself. When user data needs to be cached, the upper module 111 may need to write the user data into the cache module 112. The upper module 111 may read the cached user data from the cache module 112. Since for example the user logic unit number module and the file system module usually do not perform data synchronization with the SP 120 (namely, the upper module 121), the non-user data such as mapping information of logic storage units and metadata of the file system will only be stored in the SP 110.

The lower module 113 described here may include, for example, a flash cache module for providing data cache on a flash memory, a RAID module for providing a Redundant Arrays of Independent Disks (RAID) interface, a disk drive module and so on. Obviously, in the storage system 100, the lower module 113 cannot use the service provided by the cache module. Therefore, data in the lower module 113 cannot be cached conveniently.

Although the above depictions are provided only for SP 110, it should be appreciated that the above depictions also apply to SP 120 (e.g., for the upper module 121, the cache module 122 and the lower module 123).

It can be seen that in the conventional scheme, non-user data such as mapping information of logic storage units and metadata of a file system may only be stored in a local memory and not synchronized to a peer memory, which might lead to inconsistent states of the processors. The lower module below the cache module cannot use the service provided by the cache module. Therefore, the data in the lower module cannot be cached conveniently. In addition, when the system power supply fails, the data in the cache (e.g., the data which has not been written into the shared disk 130 yet) might get lost.

To solve one or more of the above problems and other potential problems, example embodiments of the present disclosure propose a scheme for caching data. The scheme utilizes an independent cache module to provide cache service for other modules (hereinafter referred to as "client modules") on the SP, so that the client modules can cache data like using an ordinary memory, without concerning how data are stored and synchronized. Meanwhile, the independent cache module includes a persistent storage medium capable of providing power supply failure protection with respect to the cached data.

Figure 2:
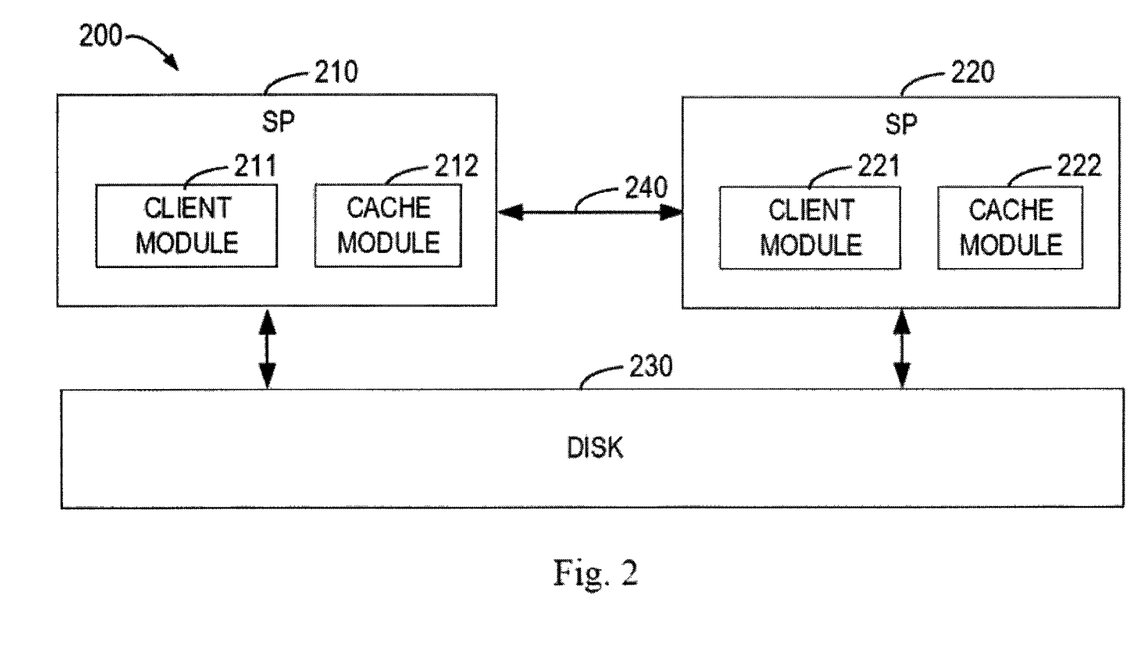
FIG. 2 illustrates a block diagram of a storage system 200 according to an embodiment of the present disclosure.

FIG. 2 illustrates a block diagram of a storage system 200 according to an embodiment of the present disclosure. Similar to the storage system 100 as shown in FIG. 1, the storage system 200 may include SP 210 and SP 220. The two SPs share one disk 230 and interact with each other via CMI 240.

Different from the storage system 100 as shown in FIG. 1, the SP 210 may include a client module 211 and a cache module 212. The client module 211 may include the upper module 111 and the lower module 113 as shown in FIG. 1. That is to say, the client module 211 may include but not limited to a host module, a user logic unit number module, a file system module, a volume cache module, a flash cache module, a RAID module, a disk driving module and so on. More generally, the client module 211 may include any module running on the SP 210 which needs to cache data, and the data to be cached may include user data (e.g., data to be written into the disk 230) and non-user data (e.g., file system metadata). Similarly, the SP 220 may include a client module 221 and a cache module 222. The client module 221 corresponds to the client module 211, and the cache module 222 corresponds to the cache module 212. That is, the client module 221 may include any module running on the SP 220 which needs to cache data, and the data to be cached may include user data and non-user data.

In some embodiments, the storage system 200 may further include a backup battery unit (BBU, not shown in FIG. 2). When the system is in a normal state, the BBU does not supply power. When an external power supply fails, the BBU may supply power to the SP 210 and SP 220 (e.g., including memories located thereon) in place of an external power supply. The BBU may be used to provide power supply failure protection to the storage system 200. Further depictions about the power supply failure protection will be provided in the following.

Figure 3:
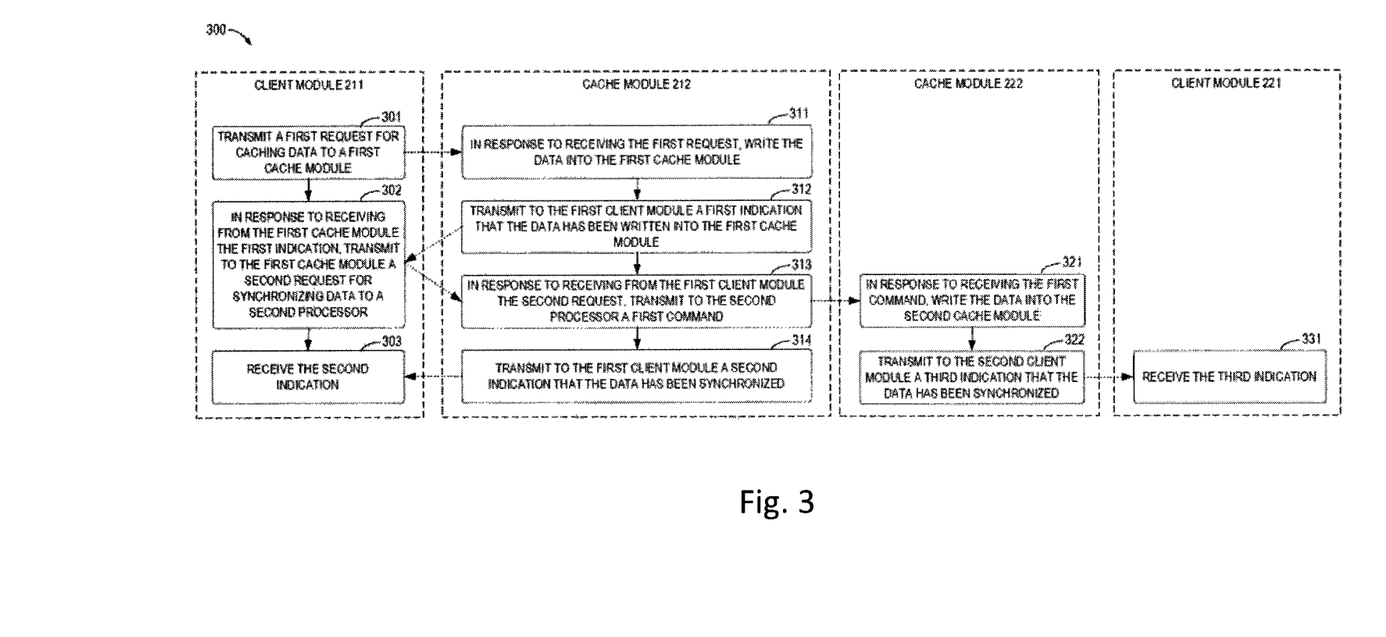
FIG. 3 illustrates a flowchart of a method 300 for caching data according to an embodiment of the present disclosure.

FIG. 3 illustrates a flowchart of a method 300 for caching data according to an embodiment of the present disclosure. Actions involved in the method 300 will be described in conjunction with FIG. 2. For ease of discussion, the depictions of the method 300 may involve two SPs, namely, SP 210 and SP 220. More specifically, the depictions of the method 300 involve the client module 211, the cache module 212, the cache module 222 and the client module 221. In FIG. 3, for example, a first column of actions may be performed by the client module 211, a second column of actions may be performed by the cache module 212, a third column of actions may be performed by the cache module 222 and a fourth column of actions may be performed by the client module 221. In the following depictions, the SP 210 and a "first processor" can be used interchangeably. The SP 220 and a "second processor" can be used interchangeably. The client module 211 and a "first client" can be used interchangeably. The cache module 212 and a "first cache module" can be used interchangeably. The cache module 222 and a "second cache module" can be used interchangeably. The client module 221 and a "second client module" can be used interchangeably. It should be appreciated that the method 300 may further include additional actions not shown and/or omit some actions as shown, and the scope of the present disclosure is not limited in this regard.

At Block 301, the first client module transmits to the first cache module a first request for caching data. For example, the data may be the user data to be written into the disk 230, or the non-user data not to be written into the disk 230, for example, the metadata of the file system, the mapping information of logic storage units or the like. Alternatively, the data may be any data that the first client module desires to cache.

At Block 311, the data is written into the first cache module in response to the first request for caching the data being received from the first client module. Then, at Block 312, a first indication that the data has been written into the first cache module is transmitted to the first client module.

Correspondingly, at Block 302, in response to receiving from the first cache module the first indication that the data has been written into the first cache module, the first client module transmits to the first cache module a second request for synchronizing the data to the second processor. The second request may cause the data to be written into the second cache module.

At Block 313, in response to the second request for synchronizing the data to the second processor being received from the first client module, a first command is transmitted to the second processor for causing the data to be written into the second cache module. Correspondingly, at Block 321, the data is written into the second cache module in response to the first command being received from the first processor.

Then, at Block 314, the first cache module transmits to the first client module a second indication that the data has been synchronized. Additionally or alternatively, at Block 322, the second cache module may transmit to the second client module a third indication that the data has been synchronized.

Correspondingly, at Block 303, the first client receives the second indication. Additionally or alternatively, at Block 331, the second client receives the third indication.

It should be appreciated that the actions performed by the SP 210 in FIG. 3 may also be performed by the SP 220, while the actions performed by the SP 220 may also be performed by the SP 110. That is, the request to cache data may also be initiated by the second client module. In this case, Blocks 301-303 may be performed by the second client module, Blocks 311-314 may be performed by the second cache module, and Blocks 321-322 may be performed by the first cache module, and Block 311 may be performed by the first client. Although the above depictions of the method 300 only involve two SPs, it should be appreciated that the method 300 may also be applied to the storage system having a plurality of SPs. The scope of the present disclose is not limited in this aspect.

In this manner, either the user data written into the disk or non-user data such as file system metadata can be synchronized among the plurality of SPs so that the states of the SPs can remain consistent.

In some embodiments, memories in the cache modules (e.g., the cache modules 212 and 222) are organized in a tree structure. A root of the tree may be a memory pool manager which manages one or more memory pools. The "memory pool" used here refers to a set of memories having the same attributes and usage. A memory pool may only belong to a specific client module, and the client module may create a plurality of memory pools. The memory pool may manage one or more storage objects, and the storage objects are used to manage storage blocks and their attributes to be used by the client. When data needs to be cached, the client module may firstly request to create a memory pool, and then request to allocate a storage object from the memory pool. After the client module obtains the allocated storage object, the client module may use the storage object to perform data cache.

Figure 4:
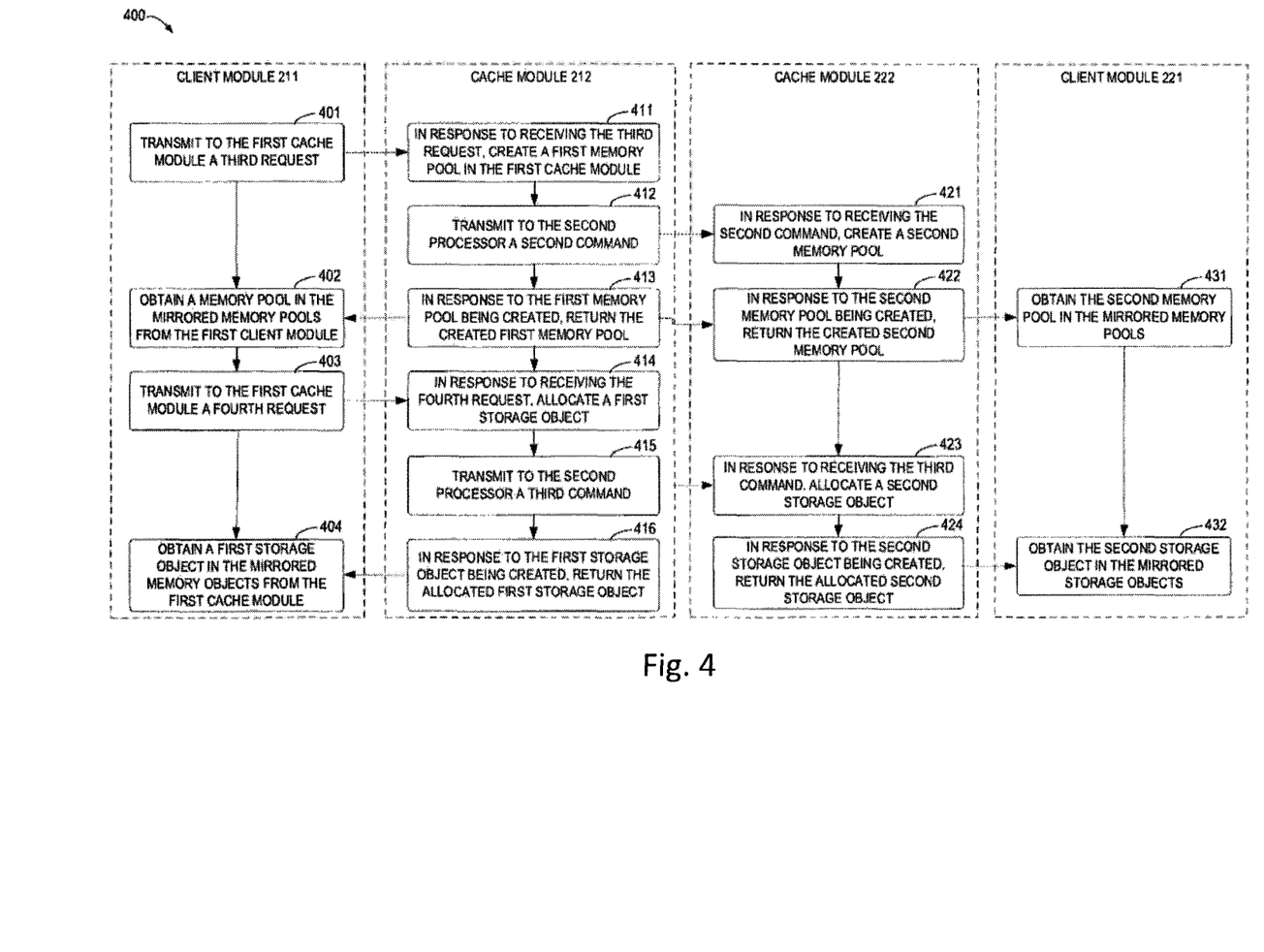
FIG. 4 illustrates a flowchart of a method 400 for obtaining a memory for caching data according to an embodiment of the present disclosure.

FIG. 4 illustrates a flowchart of a method 400 for obtaining a memory for caching data according to an embodiment of the present disclosure. In some embodiments, the method 400 may be performed prior to the method 300. The actions involved in the method 400 may be described in conjunction with FIG. 2. Similar to FIG. 3, the depictions of the method 400 involve the client module 211, the cache module 212, the cache module 222 and the client module 221. In FIG. 4, for example, a first column of actions can be performed by the client module 211, a second column of actions can be performed by the cache module 212, a third column of actions can be performed by the cache module 222 and a fourth column of actions can be performed by the client module 221. It should be appreciated that the method 400 may further include additional actions not shown and/or omit some actions as shown, and the scope of the present disclosure is not limited in this regard.

At Block 401, the first client transmits to the first cache module a third request to create mirrored memory pools on the first and second cache modules. In some embodiments, the third request may designate attributes of the mirror memory pools to be created, for example, whether to activate power supply failure protection, whether to synchronize the cache data or the like. Correspondingly, at Block 411, a first memory pool is created in the first cache module in response to the third request being received from the first client module. In some embodiments, when the first memory pool is created, a unique identifier may be allocated to identify the first memory pool.

At Block 412, the first cache module transmits to the second processor a second command for creating in the second cache module a second memory pool corresponding to the first memory pool. Correspondingly, at Block 421, the second memory pool is created in the second cache module in response to the second command being received from the first processor. In some embodiments, when the second memory pool is created, a unique identifier may be allocated to identify the second memory pool.

At Block 413, in response to the first memory pool being created, the first cache module returns the created first memory pool (e.g., the identifier of the first memory pool) to the first client module. Similarly, at Block 422, in response to the second memory pool being created, the second cache module returns the created second memory pool (e.g., the identifier of the second memory pool) to the second client module.

At Block 402, the first client may obtain from the first cache module the first memory pool (e.g., the identifier of the first memory pool) in the mirrored memory pools. The first memory pool is created on the first cache module. Similarly, at Block 431, the second client may obtain from the second cache module the second memory pool (e.g., the identifier of the second memory pool) in the mirrored memory pool. The second memory pool is created on the second cache module.

At Block 403, the first client may transmit to the first cache module a fourth request to allocate from the mirrored memory pools mirrored storage objects for caching data. Correspondingly, at Block 414, in response to receiving the fourth request from the first client module, the first cache module allocates a first storage object from the first memory pool.

In Block 415, the first cache module transmits to the second processor a third command for allocating a second storage object corresponding to the first storage object. Correspondingly, at Block 423, the second storage object is allocated from the second memory pool in response to the third command being received from the first processor.

At Block 416, in response to the first storage object being allocated, the first cache module returns the allocated first storage object to the first client module. Similarly, at Block 424, in response to the second storage object being allocated, the second cache module returns the allocated second storage object to the second client module.

Correspondingly, at Block 404, the first client obtains from the first cache module the first storage object in the mirrored memory objects. The first storage object is allocated from the first memory pool. Similarly, at Block 432, the second client obtains from the second cache module the second storage object in the mirrored memory objects. The second storage object is allocated from the second memory pool.

It should be appreciated that the actions performed by the SP 210 in FIG. 4 may also be performed by the SP 220, while the actions performed by the SP 220 may also be performed by the SP 110. That is, the request to create mirrored memory pools may also be initiated by the second client module. In this case, Blocks 401-403 may be performed by the second client module, Blocks 411-416 may be performed by the second cache module, and Blocks 421-424 may be performed by the first cache module, and Blocks 431-432 may be performed by the first client. Although the above depictions of the method 400 only involve two SPs, it should be appreciated that the method 400 may also be applied to the storage system having a plurality of SPs. The scope of the present disclose is not limited in this aspect.

In this manner, the client modules can cache data like using an ordinary memory, without concerning how data are stored and synchronized. For example, in response to the mirrored storage objects for caching the data being obtained, the method 300 may be performed. That is, the first client module may transmit a request to the first cache module to write the data into the first storage object (Block 301). Correspondingly, the first cache module may write the data into the first storage object (Block 311). Then, the first client module may transmit a request to the first cache module to synchronize data to the second processor (Block 302). The first cache module may transmit to the second processor a command for causing the data to be written into the second cache module (Block 313). Correspondingly, the second cache module may write data into the second storage object (Block 321).

In some embodiments, the cache modules 212 and 222 as shown in FIG. 2 may include a transient storage medium and a persistent storage medium. The transient storage medium for example may include a dynamic random access memory (DRAM) and any transient storage medium currently known or to be developed. The persistent storage medium for example may include a solid-state disk (SSD) and any persistent storage medium current known or to be developed. For example, the data may be cached in the transient storage medium, while the persistent storage medium may be used to provide power supply failure protection to the cached data. For example, when the power supply fails, the cached data may be transferred to the persistent storage medium, and when the power supply failure recovers, the data may be transferred from the persistent memory back to the transient storage medium.

Figure 5:
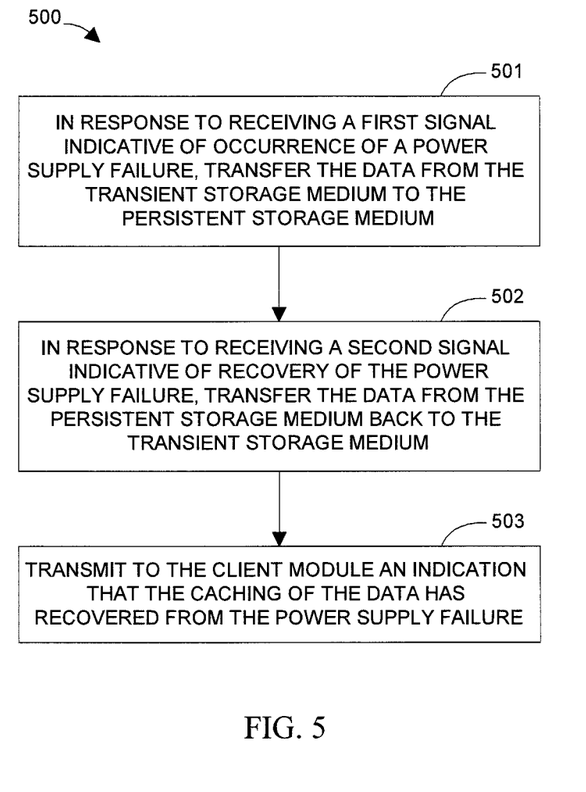
FIG. 5 illustrates a flowchart of a method 500 for performing power supply failure protection for the cached data according to an embodiment of the present disclosure.

FIG. 5 illustrates a flowchart of a method 500 for performing power supply failure protection for the cached data according to an embodiment of the present disclosure. In some embodiments, the method 500 may be performed by the cache module 212 and/or 222. In addition, the method 500 may be performed in parallel with the method 300 and/or 400. It should be appreciated that the method 500 may further include additional actions not shown and/or omit some actions as shown, and the scope of the present disclosure is not limited in this regard.

At Block 501, in response to receiving a first signal indicative of occurrence of the power supply failure, the cache module transfers the data from the transient storage medium to the persistent storage medium.

Figure 6:
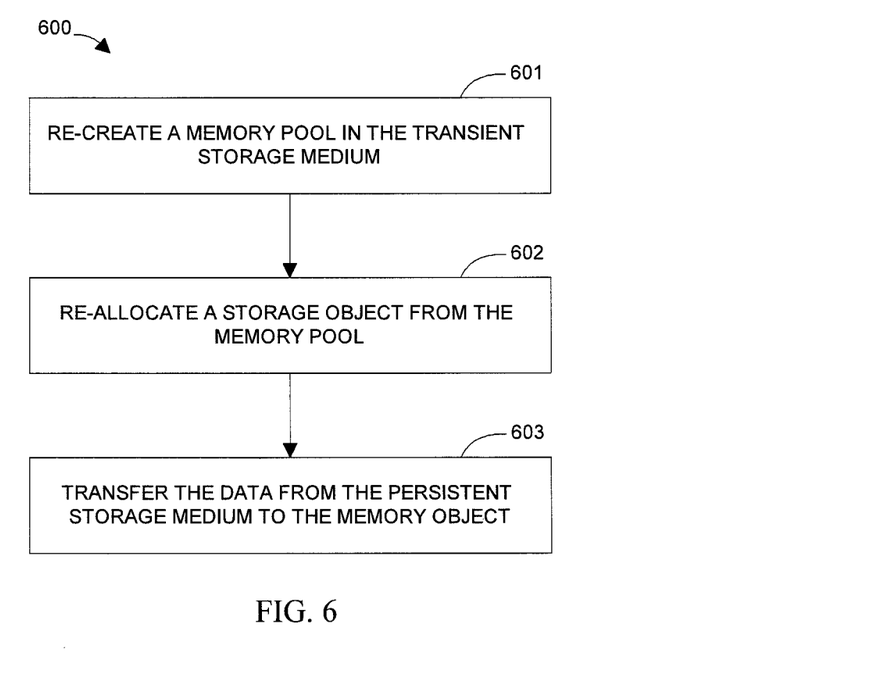
FIG. 6 illustrates a flowchart of a method 600 for recovering data in a cache module according to an embodiment of the present disclosure.

When the power supply failure recovers, at Block 502, in response to receiving a second signal indicative of the power supply failure recovery, the cache module transfers the data from the persistent storage medium back to the transient storage medium. In some embodiments, the cache module may need to re-create a corresponding memory organization structure in the transient storage medium for the data transferred back to the transient storage medium. FIG. 6 illustrates a flowchart of a method 600 for recovering data in a cache module according to an embodiment of the present disclosure. In some embodiments, the method 600 may be performed as an example of the Block 502 in the method 500.

At Block 601, the memory pool is re-created in the transient storage medium. At Block 602, the memory object is re-allocated from the recreated memory pool. At Block 603, the data is transferred from the persistent storage medium to the corresponding memory object.

It should be appreciated that the method 600 may further include additional actions not shown and/or omit some actions as shown, and the scope of the present disclosure is not limited in this regard. In addition, the method 600 may be performed iteratively until all memory pools and storage objects are re-created in the cache module.

Returning to FIG. 5, at Block 503, the cache module may transmit to the client an indication that the caching of the data has recovered from the power supply failure. In some embodiments, when the power supply failure recovers, the client needs to perform some corresponding actions to complete data recovery. Additionally, the client may perform the corresponding actions in response to receiving the indication that the caching of the data has recovered from the power supply failure.

Figure 7:
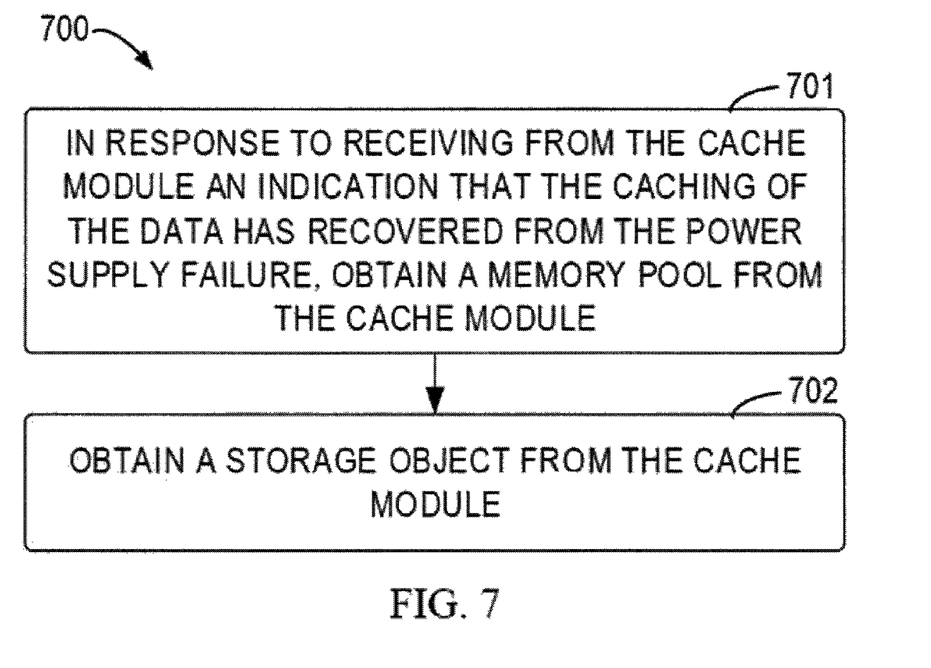
FIG. 7 illustrates a flowchart of a method 700 for recovering data in a client module according to an embodiment of the present disclosure.

FIG. 7 illustrates a flowchart of a method 700 for recovering data in a client module according to an embodiment of the present disclosure. In some embodiments, the method 700 may be performed by the client module 211 and/or 221. In addition, the method 700 may be executed consecutively with the method 500. It should be appreciated that method 700 may further include additional actions not shown and/or omit some shown actions, and the scope of the present disclosure is not limited in this regard.

At Block 701, a memory pool is obtained from the cache module in response to receiving from the cache module (e.g., the cache module 212 and/or 222) the indication that the caching of the data has recovered from the power supply failure. Correspondingly, the cache module may return the re-created memory pool (e.g., the identifier of the memory pool) to the client module. Then, at Block 702, the client module obtains the storage object from the cache module. Correspondingly, the cache module may return the re-created storage object to the client module.

In this manner, the client module can obtain the memory used by itself before the power supply failure, and then use the obtained memory to perform subsequent procedures.

Figure 8:
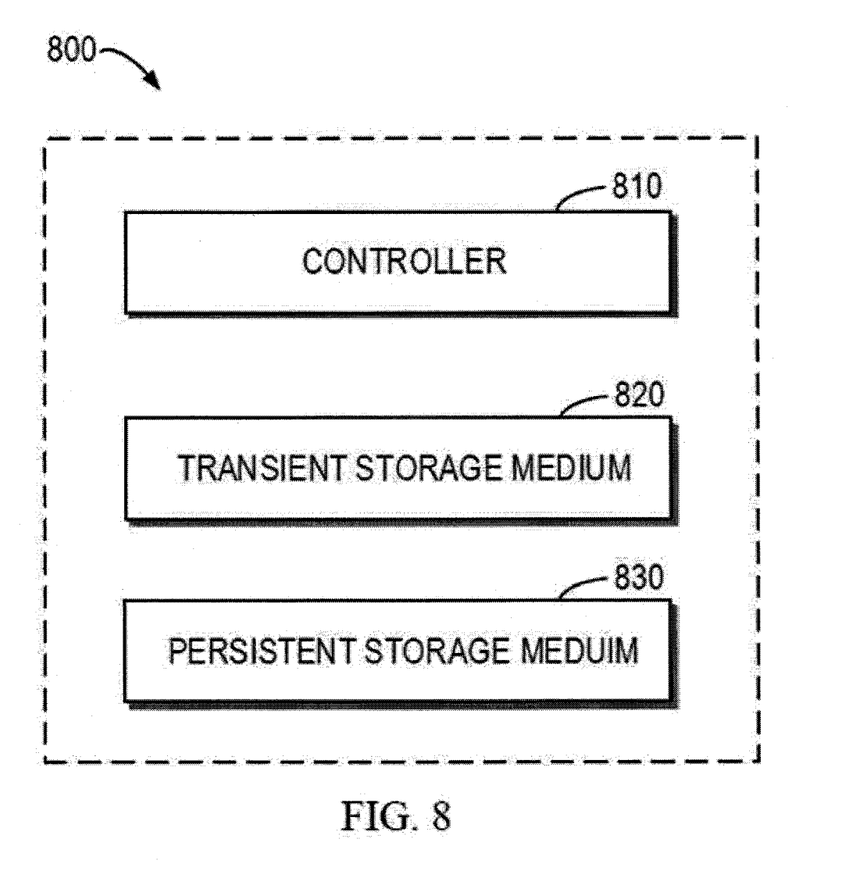
FIG. 8 illustrates a block diagram of a cache component 800 according to an embodiment of the present disclosure.

FIG. 8 illustrates a block diagram of a cache component 800 according to an embodiment of the present disclosure. For example, the cache module 212 and/or 222 as shown in FIG. 2 may be implemented as the cache component 800. As shown in FIG. 8, the cache component 800 may include a controller 810, a transient storage medium 820 and a persistent storage medium 830. The controller 810 may be configured to write data into the cache component 800 (e.g., the transient storage medium 820) in response to receiving a first request for caching data from a client module running on a first processor. The controller 810 may be further configured to transmit to the client module a first indication that the data has been written into the cache component 800. The controller 810 may be further configured to, in response to receiving from the client module a second request for synchronizing the data to a second processor, transmit to the second processor a first command for causing the data to be written into the second cache module on the second processor. In addition, the controller 810 may be further configured to transmit to the client module a second indication that the data has been synchronized.

In some embodiments, the controller 810 may be further configured to, in response to receiving a first signal indicative of occurrence of a power supply failure, transfer the data from the transient storage medium 820 to the persistent storage medium 830. The controller 810 may be further configured to, in response to receiving a second signal indicative of recovery of the power supply failure, transfer the data from the persistent storage medium 830 back to the transient storage medium 820. In addition, the controller 810 may be further configured to transmit to the client module an indication that the caching of the data has recovered from the power supply failure.

Using the independent cache module as shown in FIG. 8, in the storage system (for example, the storage system shown in FIG. 2) having dual SPs sharing one disk, any client module may conveniently implement an active-active mode, that is, states of two mirrored client modules in the two SPs stay completely consistent.

For purpose of clarity, some optional parts of the cache component 800 are not shown in FIG. 8. However, it should be appreciated that features described with reference to FIGS. 2-7 also apply to the cache component 800. Furthermore, parts of the cache component 800 may be hardware parts or software parts. For example, in some embodiments, the cache component 800 may be partially or completely implemented using software and/or firmware, e.g., implemented as a computer program product embodied on a computer readable medium. Alternatively or additionally, the cache component 800 may be partially or completely implemented based on hardware, e.g., implemented as an integrated circuit (IC), an application-specific integrated circuit (ASIC), a system on chip (SOC), a field programmable gate array (FPGA), etc. The scope of the present disclosure will not be limited in this aspect.

Embodiments of the present disclosure further provide a client component. The client component runs on the first processor and comprises a controller. The controller is configured to: transmit, to a first cache module on the first processor, a first request for caching data; in response to receiving from the first cache module a first indication that the data has been written into the first cache module, transmit, to the first cache module, a second request for synchronizing the data to a second processor, such that the data is written into a second cache module on the second processor; and receive a second indication that the data has been synchronized.

Figure 9:
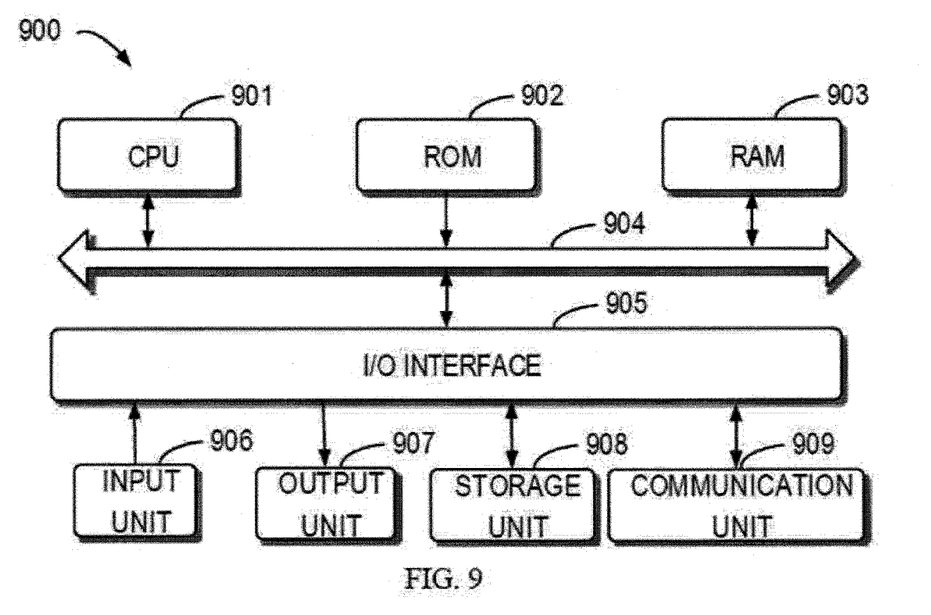
FIG. 9 illustrates a block diagram of a computer system 900 adapted to implement exemplary embodiments of the present disclosure.

FIG. 9 illustrates a block diagram of an example device 900 adapted to implement an exemplary embodiment of the present disclosure. As shown in the figure, the device 900 comprises a central processing unit (CPU) 901 that may perform various appropriate actions and processing based on computer program instructions stored in a read-only memory (ROM) 902 or computer program instructions loaded from a memory unit 908 to a random access memory (RAM) 903. In the RAM 903, there further store various programs and data needed for operations of the device 900. The CPU 901, ROM 902 and RAM 903 are connected to each other via a bus 904. An input/output (I/O) interface 905 is also connected to the bus 904.

Various components in the device 900 are connected to the I/O interface 905, including: an input 909 such as a keyboard, a mouse and the like; an output unit 907 including various kinds of displays and a loudspeaker, etc.; a memory unit 908 including a magnetic disk, an optical disk, and etc.; a communication unit 909 including a network card, a modem, and a wireless communication transceiver, etc. The communication unit 909 allows the device 900 to exchange information/data with other devices through a computer network such as the Internet and/or various kinds of telecommunications networks.

Various processes and processing described above, e.g., methods 300, 400, 500 and/or 600, may be executed by the processing unit 901. For example, in some embodiments, the methods 300, 400, 500 and/or 600 may be implemented as a computer software program that is tangibly embodied on a machine readable medium, e.g., the storage unit 908. In some embodiments, part or all of the computer program may be loaded and/or mounted onto the device 900 via ROM 902 and/or communication unit 909. When the computer program is loaded to the RAM 903 and executed by the CPU 901, one or more steps of the at least one of the methods 300, 400, 500 and/or 600 as described above may be executed.

The present disclosure may be a method, apparatus, system and/or computer program product. The computer program product may include a computer readable medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for caching data, comprising:
   in response to receiving a first request for caching data from a client module running on a first processor, writing the data into a first cache module on the first processor;
   transmitting, to the client module, a first indication that the data has been written into the first cache module;
   in response to receiving, from the client module, a second request for synchronizing the data to a second processor, transmitting, to the second processor, a first command for causing the data to be written into a second cache module on the second processor;
   transmitting, to the client module, a second indication that the data has been synchronized;
   creating, in the first cache module, a first memory pool dedicated to the client module; and
   allocating, from the first memory pool, a first storage object for caching the data;
   wherein creating the first memory pool comprises:
      in response to receiving, from the client module, a third request for creating mirror memory pools on the first and second cache modules, creating the first memory pool in the first cache module;
      transmitting, to the second processor, a second command for creating in the second cache module a second memory pool mirrored with the first memory pool; and
      in response to the first memory pool being created, returning the created first memory pool to the client module.

2. The method of claim 1, wherein the first cache module includes a transient storage medium and a persistent storage medium, the data is cached in the transient storage medium, and the method further comprises:
   in response to receiving a first signal indicative of occurrence of a power supply failure, transferring the data from the transient storage medium to the persistent storage medium;
   in response to receiving a second signal indicative of recovery of the power supply failure, transferring the data from the persistent storage medium back to the transient storage medium; and
   transmitting, to the client module, an indication that the caching of the data has recovered from the power supply failure.

3. The method of claim 2, wherein transferring the data from the persistent storage medium back to the transient storage medium comprises:
   re-creating the first memory pool in the transient storage medium;
   re-allocating the first storage object from the first memory pool; and
   transferring the data from the persistent storage medium to the first storage object.

4. A method for caching data, comprising:
   in response to receiving a first request for caching data from a client module running on a first processor, writing the data into a first cache module on the first processor;
   transmitting, to the client module, a first indication that the data has been written into the first cache module;
   in response to receiving, from the client module, a second request for synchronizing the data to a second processor, transmitting, to the second processor, a first command for causing the data to be written into a second cache module on the second processor;
   transmitting, to the client module, a second indication that the data has been synchronized;
   creating, in the first cache module, a first memory pool dedicated to the client module; and
   allocating, from the first memory pool, a first storage object for caching the data;
   wherein allocating the first storage object comprises:
      in response to receiving, from the client module, a fourth request for allocating mirror storage objects, allocating the first storage object from the first memory pool;
      transmitting, to the second processor, a third command for allocating a second storage object mirrored with the first storage object; and
      in response to the first storage object being allocated, returning the allocated first storage object to the client module.

5. The method of claim 4, wherein writing the data into the first cache module comprises:
   writing the data into the first storage object.

6. The method of claim 4, wherein transmitting the first command comprises:
    transmitting, to the second cache module, the first command for causing the data to be written into the second storage object.

7. The method of claim 4, wherein the first cache module includes a transient storage medium and a persistent storage medium, the data is cached in the transient storage medium, and the method further comprises:
    in response to receiving a first signal indicative of occurrence of a power supply failure, transferring the data from the transient storage medium to the persistent storage medium;
    in response to receiving a second signal indicative of recovery of the power supply failure, transferring the data from the persistent storage medium back to the transient storage medium; and
    transmitting, to the client module, an indication that the caching of the data has recovered from the power supply failure.

8. The method of claim 7, wherein transferring the data from the persistent storage medium back to the transient storage medium comprises:
    re-creating the first memory pool in the transient storage medium;
    re-allocating the first storage object from the first memory pool; and
    transferring the data from the persistent storage medium to the first storage object.

9. A method for caching data, comprising:
    transmitting, to a first cache module on a first processor, a first request for caching data;
    in response to receiving, from the first cache module, a first indication that the data has been written into the first cache module, transmitting, to the first cache module, a second request for synchronizing the data to a second processor, such that the data is written into a second cache module on the second processor;
    receiving a second indication that the data has been synchronized;
    transmitting, to the first cache module, a third request for creating mirror memory pools on the first and second cache modules;
    obtaining, from the first cache module, a memory pool of the mirror memory pools, the memory pool being created on the first cache module;
    transmitting, to the first cache module, a fourth request for allocating mirror storage objects for caching the data from the mirror memory pools; and
    obtaining, from the first cache module, a storage object of the mirror memory objects, the storage object being allocated from the first memory pool.

10. The method of claim 9, wherein transmitting the first request comprises:
    transmitting the first request for caching the data in the storage object.

11. The method of claim 9, further comprising:
    in response to receiving, from the first cache module, an indication that the caching of the data has recovered from a power supply failure, obtaining the memory pool from the first cache module; and
    obtaining the storage object from the first cache module.

12. A method for caching data, comprising:
    in response to receiving, from a first processor, a first command for synchronizing data cached in a first cache module on the first processor to a second processor, writing the data into a second cache module on the second processor;
    wherein the data is cached in a first storage object in a first memory pool in the first cache module, and the method further comprises:
        in response to receiving, from the first processor, a second command for creating in the second cache module a second memory pool mirrored with the first memory pool, creating the second memory pool in the second cache module; and
        in response to receiving, from the first processor, a third command for allocating a second storage object mirrored with the first storage object, allocating the second storage object from the second memory pool;
    wherein the first memory pool and the second memory pool are mirror memory pools such that the second storage object allocated from the second memory pool is mirrored with the first storage object in the first memory pool.

13. The method of claim 12, wherein writing the data into the second cache module comprises:
    writing the data into the second storage object.

* * * * *